Patented Feb. 22, 1949

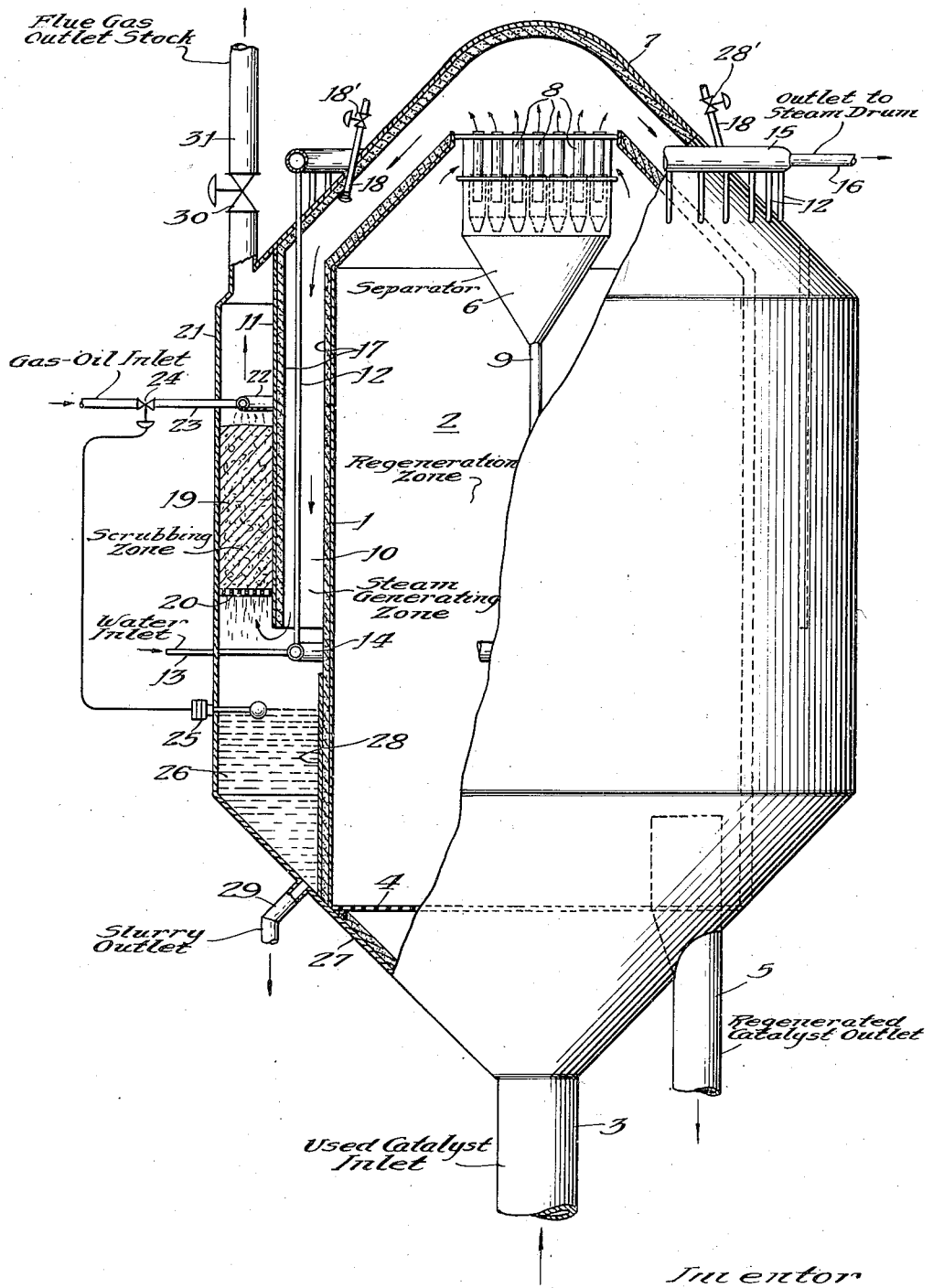

2,462,193

UNITED STATES PATENT OFFICE 2,462,193

CATALYST REGENERATOR AND RECOVERY APPARATUS

William E. Hulsberg, Hinsdale, Ill., assignor to Universal Oil Products Company, Chicago, Ill., a corporation of Delaware Application April 9, 1945, Serial No. 587,251

6 Claims. (Cl. 23—288)

This invention relates to an improved apparatus for the regeneration and recovery of fluidized catalyst particles. The apparatus incorporates in a single unit a catalyst regenerator, a steam generating or heat recovery zone, and a flue gas scrubbing zone for the recovery of catalyst particles.

In the fluidized catalytic conversion of hydrocarbons the catalyst becomes contaminated in the reactor zone with a deleterious carbonaceous deposit. The fluidized conversion process is a continuous one, the deleterious deposit is burned from the catalyst particles in the regenerator and the particles then returned for reuse to the reactor where a continuous conversion process takes place. The fluidized catalytic cracking of hydrocarbons in particular, using a finely divided catalyst, is now well known to those familiar with the cracking art. It is advantageous to recover as much of the catalyst as possible following the regeneration of the particles so that they may be reused in the conversion process. The catalyst may be a natural clay or it may be a synthetically prepared finely divided alumina-silica material, the nature of these various catalysts and their method of preparation are now known to those familiar with the art.

There are two principal methods of recovering catalyst fines subsequent to the regeneration of the catalyst particles and the initial cyclone separation step at the top of the regenerator. One method makes use of the Cottrell electrical precipitator, which is a rather expensive apparatus comprising a large chamber having a number of electrical elements therein. These elements are capable of ionizing the catalyst particles and precipitating them from the flue gas stream as it flows therethrough. A second method of recovering fine catalyst particles, subsequent to the regenerating step and the cyclone separating stage at the gas exit from the regenerator, entails the use of an oil scrubber. In the oil scrubber, catalyst fines are substantially all washed from the flue gases by a countercurrently flowing gas-oil stream. In both of the above methods, a waste heat boiler is usually placed in the path of the flue gas at some point between the regenerator and the electrical precipitator or the scrubber. A steam generating boiler performs two functions, that of decreasing the temperature of the gas stream prior to its entry in the Cottrell or in the oil scrubber, and that of recovering normally waste heat by the generation of steam in the boiler or heat exchange type of apparatus.

The improved apparatus of this invention combines within one unit or chamber, a regeneration zone, a steam generating zone and a flue gas scrubbing zone for the recovery of catalyst particles. The apparatus in its preferred form has an internal cylindrically shaped chamber for catalyst regeneration with the accompanying two zones housed in anular spaces surrounding this regenerating zone. A steam generating zone is in the inner annular space between an intermediate wall and the regenerating chamber shell, while the flue gas scrubbing zone is in the outer annular space between the outer shell of the unit and the intermediate cylindrical wall.

Construction of the apparatus is such that the flue gas upon leaving the top of the regenerator flows down around the regenerator wall into the inner annular space, over a plurality of vertically placed steam generating tubes distributed within this annular space; much of the flue gas heat is thus dissipated, being absorbed by the tube bank in the generation of steam. The intermediate cylindrical wall is not as long as the inner and outer shells, so that the inner annular heat removing zone connects at the lower end with the outer annular scrubbing zone. Thus, the flow is upward through the contact bed in the said outer annular zone and the flue gases are washed substantially free of catalyst particles before they are exhausted from the unit. The liquid scrubbing medium, flowing downward through the contact bed, forms a catalyst slurry, which can drop into a reservoir, below the scrubbing zone, and from which the slurry may be gradually withdrawn. The washed flue gases are exhausted from the upper part of the outer annular zone through a pressure controlling means into the flue gas stack.

There are several advantages to this novel and improved apparatus. The insulated flue gas conduits or ducts which are normally required between the regenerator and waste heat boiler and between the waste heat boiler and the oil scrubber are unnecessary with the use of this invention. The expensive bellows type of expansion joints normally required, as well as the flue gas conduits, will also be eliminated. Separate scrubbing and waste heat boiler units with their independent supporting structures are no longer required with the use of this combined unit, while the supporting structure of the combined unit need be only slightly larger than that required by the normal regenerating unit. With gas-oil being used as a scrubbing medium the oil and catalyst slurry may be charged to the reactor together with the usual oil and regenerated catalyst charge. Since the regenerator level is normally positioned some distance above the inlet to the reactor, then the slurry may flow by gravity from the reservoir to the reactor. The slurry pump, which is necessarily used with the separate scrubber column, thus becomes unnecessary when the scrubbing zone is combined in the regenerating unit. It should be noted that the construction of the combined unit is such that the internal regenerator chamber expansion is entirely independent of the outer shells; also that the flow of the gas is such that the pressure on the interior of the regenerator is very little different from that in the zone surrounding the regenerator chamber shell, allowing the shell to be relatively light in weight.

The accompanying drawing shows an elevational view, partially in section, of the apparatus comprising this invention and the following description thereof should make the construction and advantages of the invention more apparent.

Referring now to the drawing, the inner shell 1 encloses the regeneration zone 2 wherein used catalyst particles having a carbonaceous deposit, are subjected to a burning operation while in a fluidized state of hindered settling. The used catalyst is carried to this regeneration zone 2 in a fluidized phase by way of conduit 3 and by means of an air or oxygen containing gas stream, from the outlet of the hydrocarbon reaction or conversion zone (not shown). The perforated grid plate 4 at the lower end of the regenerator, is used to distribute the incoming catalyst and gas stream. The regenerated catalyst is drawn off through outlet 5, and is returned to the reaction zone for reuse. The combustion gases from the burning operation, or the flue gas, passes from the top of the regenerator through a cyclone separator 6 to the space between the regeneration zone 2 and the upper dome 7 of the apparatus. The separator 6 functions to remove as much of the entrained catalyst as possible. A plurality of "Multi-clone" type of cyclone separating units 8 are indicated discharging into a common hopper with a single "dip-pipe" 9; however, other separators such as the Buell type may well as used.

The flue gas with the major portion of the fine catalyst removed passes from the top of the regenerating unit down through the annular space or steam generating zone 10 which is between the regenerator shell 1 and the intermediate circular shell 11. A plurality of vertical tubes 12 are placed circumferentially around and extending into this zone 10, to form a steam generating bank which will absorb heat from the flue gas stream. Water enters the steam generating tubes 12 through the inlet conduit 13 and the lower circular header 14. The generated steam is drawn off through the upper circular header 15 and the outlet conduit 16, being sent to a suitable steam collecting drum, which is not shown.

A high temperature insulating material 17 is shown attached to the wall 1 of the regenerating zone 2 and on the interior of the top dome 7 and the intermediate wall 11. The type of insulating material 17 whether of insulating cement or a refractory, as well as the method of attachment, should of course be suitable for the temperature conditions to be encountered. The grid 4 and the shell 1 should also be made of alloy or metals suitable for the operation.

A series of quenching nozzles 18 are provided at spaced points around and projecting into the upper part of the steam generating zone 10. The nozzles 18 with the flow of the quenching liquid controlled by valves 18', are normally used only at periods when the flue gas temperature is excessive, as in the case of "afterburning" of the gases outside of the oxidation and regenerating zone 2, or at periods to give aid in decreasing the flue gas temperature when the steam generating tube bank 12 is not functioning properly to effect the desired temperature drop.

The flow of the flue gas upon leaving the heat reducing zone 10 is downward, such that the flow must reverse direction and flow upward through the scrubbing zone and contact bed 19. The contact bed 19 may be of Raschig rings or some similar packing medium, being supported on a perforated plate or grating 20, in the annular space between the intermediate wall 11 and the outer shell 21 of the apparatus. Baffle plates or "side to side" decks may also be used in the contact zone in lieu of a packing material if it is so desired. The scrubbing medium which is to flow downward through the contact bed 19, countercurrent to the gas stream, may comprise a portion of the gas-oil charge to the reactor in connection with the fluid catalyst cracking process, or it may be some other suitable fluid, for other processes. The scrubbing operation will substantially free the flue gas of any entrained catalyst particles, also the 180° turn required by the flow stream around the lower end of wall 11 should cause some of the particles to be dropped out prior to the scrubbing operation. The gas-oil or washing liquid is sprayed onto the contact bed 19 through the perforated circular header 22. The gas-oil or liquid medium is charged to the header 22 through an inlet conduit 23, with the rate of flow regulated by a control valve 24. The control valve 24 is in turn regulated by the liquid level control apparatus 25 at the slurry reservoir 26.

The slurry of catalyst and scrubbing oil, from the contact zone 19, falls to the bottom of the annular zone or reservoir space 26 which is formed by the bottom head 27, the outer shell 21 and the regenerator wall 1. When the insulating material 17 is on the exterior of the shell 1 as shown, then an additional metal wall 28 is necessary for the slurry reservoir zone 26. The catalyst slurry may be drawn off through a conduit 29 provided at the lower end of the annular reservoir.

The waste flue gas after the scrubbing operation is discharged from the apparatus through one or more pressure control valves 30 or other suitable pressure reducing means, and through one or more flue gas outlet stacks 31.

It should be noted that the inner chamber wall 1 and the intermediate wall 11 are not subjected to unequal pressure loadings and therefore may be of relatively light construction. Also, these same inner walls are free to expand without any expansion joints or the like being required.

It is not intended to limit this invention or the apparatus to the particular construction details described or shown in the drawing. Many variations may be made to the apparatus and still come within the scope of this invention. For instance, modifications may be made as to size and shape; the type of cyclone separator; the type of contact bed in the scrubbing zone; the type of insulation and the method of attachment to the walls; the type of grid distribution plate, etc.

I claim as my invention:

1. An apparatus of the class described comprising in combination an inner chamber, an outer chamber spaced from said inner chamber, means dividing the space between said chambers into two annular zones communicating at their lower ends, a cyclone separator in the upper portion of said inner chamber and communicating with the upper end of the inner one of said annular zones, cooling means in the inner annular zone, contact means in the outer one of said annular zones, an inlet to the outer annular zone above said contact means, an outlet from the upper portion of the outer annular zone, and a reservoir between said inner and outer chambers below said annular zones.

2. An apparatus of the class described comprising an outer chamber, an inner chamber having side and top walls spaced from the side and top walls, respectively, of the outer chamber, said chambers having a common bottom wall, an opening in the top wall of the inner chamber and a cyclone separator positioned therein, an intermediate vertical wall between and spaced from the side walls of said chambers and terminating above said bottom wall, heat exchange tubes in the space between said intermediate wall and the side wall of the inner chamber, contact means in the space between said intermediate wall and the side wall of the outer chamber, an inlet to the last-named space above said contact means, and an outlet from the upper portion of said last-named space.

3. An apparatus of the class described comprising in combination an internal regenerating chamber, an external chamber around said internal chamber, an intermediate wall between and concentric with both of said chambers forming thereby two annular zones, an inlet and an outlet connected to the lower end of said regenerating chamber, separating means positioned in the upper part of said internal regenerating chamber and communicating with the innermost annular zone, a heat exchanger positioned in said inner annular zone having inlet and outlet means, contact means in the outermost annular zone, an inlet and distributing means above said contact means in said outermost annular zone, means connecting the lower part of said innermost annular zone and the lower part of said outermost annular zone, a reservoir below and common to said annular zones, an outlet from said reservoir, and outlet means from the upper part of said outer annular zone.

4. An apparatus of the class described comprising in combination a vertically positioned cylindrical outer chamber, a concentric inner chamber, an intermediately positioned wall depending from the top of said outer chamber and forming thereby two annular zones between said inner and said outer chambers, an inlet at the lower end of said inner chamber, a perforated plate in the lower portion of said inner chamber, a drawoff outlet from the interior of said inner chamber, a cyclone separator having an outlet at the upper end of said inner chamber, a flow space between the upper ends of said inner and said outer chambers connecting said outlet with the innermost zone of said two annular zones, a plurality of spaced apart vertically positioned heat exchange tubes in said inner annular zone, an inlet header to the lower end of each of said tubes, an outlet header to the upper end of each of said tubes, a contact bed in the outermost annular zone of said annular zones, an inlet and distributing header above said contact bed in said outermost zone, an outlet at the upper end of said outermost annular zone, a reservoir open to each of said annular zones and confined between said inner and outer chambers below said intermediate depending wall, and an outlet from the lower end of said reservoir.

5. The apparatus as described in claim 4 further characterized in that a plurality of spaced apart spray nozzles are provided projecting into the upper portion of said inner annular zone.

6. The apparatus as described in claim 4 further characterized in that a liquid level control means in the upper part of said reservoir connects with and controls a valve in said inlet to said distributing header in said outer zone.

WILLIAM E. HULSBERG.

REFERENCES CITED

The following references are of record in the file of this patent:

UNITED STATES PATENTS

| Number | Name | Date |
| --- | --- | --- |
| 1,141,266 | Raschig | June 1, 1915 |
| 1,691,971 | Hansard et al. | Nov. 20, 1928 |
| 2,207,774 | Barthelemy | July 16, 1940 |